May 21, 1929.    B. J. GUIDARELLI    1,713,600
NUT CRACKING MACHINE
Filed Dec. 19, 1927    2 Sheets-Sheet 1

Inventor:
Benjamin J. Guidarelli,
By Wm. F. Freudenreich
Atty.

May 21, 1929.  B. J. GUIDARELLI  1,713,600
NUT CRACKING MACHINE
Filed Dec. 19, 1927  2 Sheets-Sheet 2
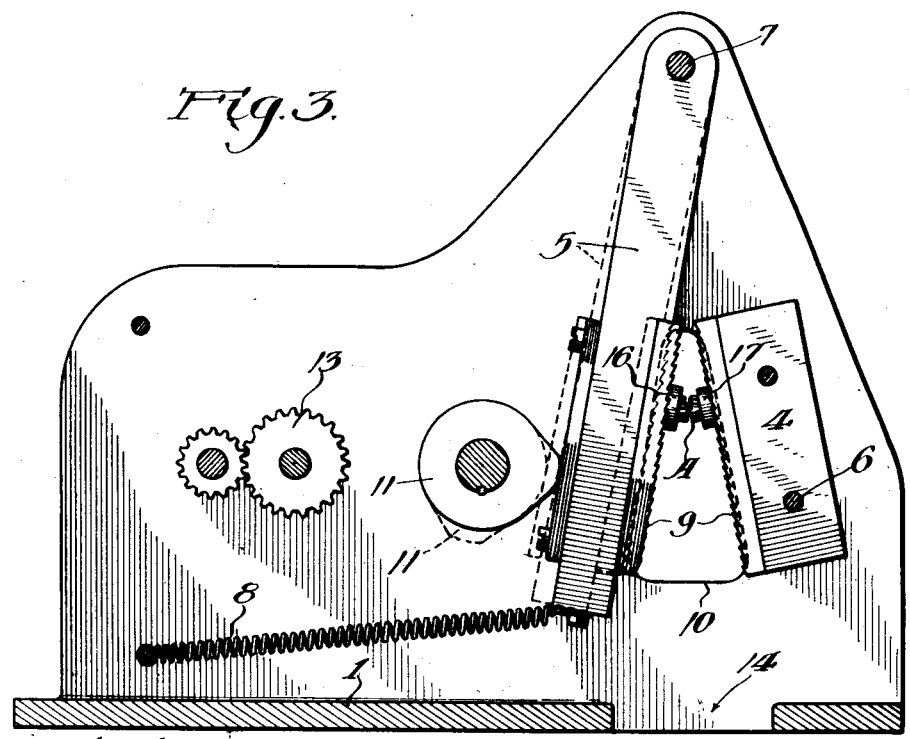
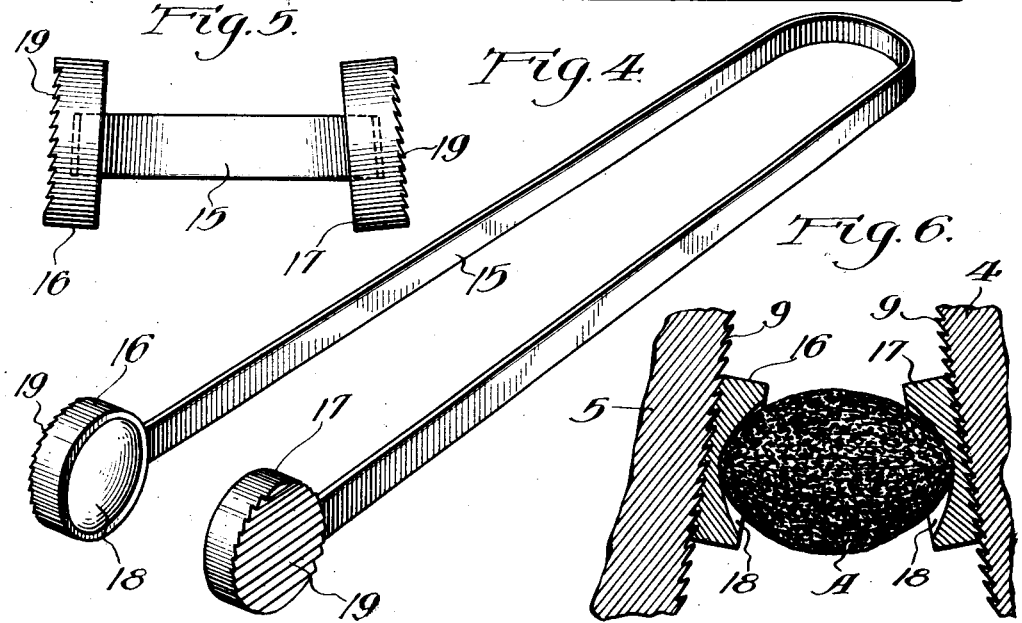
Inventor:
Benjamin J. Guidarelli, Patented May 21, 1929.

1,713,660

UNITED STATES PATENT OFFICE.

BENJAMIN J. GUIDARELLI, OF CHICAGO, ILLINOIS.

NUT-CRACKING MACHINE.

Application filed December 19, 1927. Serial No. 241,257.

The present invention has for its object to produce a simple efficient machine for cracking individual nuts.

Specifically considered, the present invention may be said to have for its object to produce a simple and novel machine for cracking nuts, into which individual nuts may be placed in quick succession and be effectively gripped, regardless of variations in size, during the cracking operation.

Figure 1:
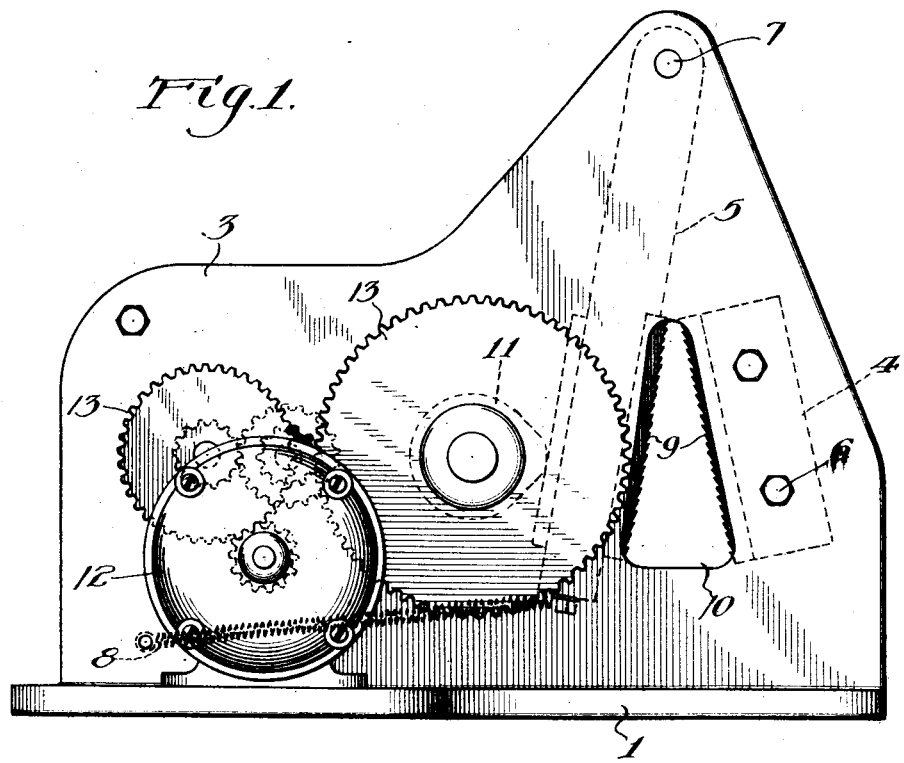
Figure 2:
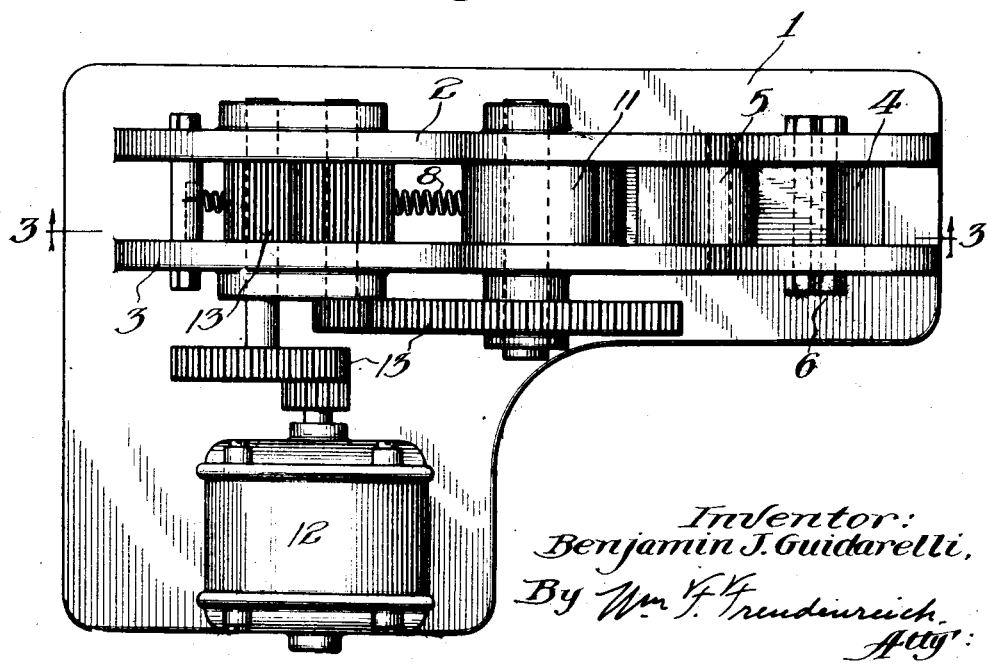

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side view of a machine arranged in accordance with my invention; Fig. 2 is a top plan view; Fig. 3 is a vertical section taken on line 3—3 of Fig. 2; Fig. 4 is a perspective view of a holder for an individual nut; Fig. 5 is an end view of the holder, on a larger scale than Fig. 4; and Fig. 6 is a vertical section through fragments of the jaws and the holder, showing a nut positioned between the jaws and about to be cracked.

Referring to the drawings, 1 represents a horizontal table or base from which rise two parallel vertical walls, 2 and 3 spaced apart from each other. Fitting between the walls are two jaws 4 and 5; the jaw 4 being fixed to the walls by means of bolts 6, or otherwise, preferably at a slight angle to the vertical; and the jaw 5 being hung from its upper end on a pin 7, so as to permit it to swing from and toward the stationary jaw. A tension spring 8 is fastened at its ends respectively to the lower end of the swinging jaw and to the vertical walls for the purpose of moving the swinging jaw away from the stationary jaw. The two jaws have teeth on their working faces; these being preferably in the form of ratchet teeth, as indicated at 9, whose inclined faces are directed downwardly, and whose holding faces are directed upwardly. The two vertical walls are preferably cut away to form windows 10 opposite the space between the working faces of the two jaws.

The swinging jaw is adapted to be moved toward the stationary jaw, against the resistance of the spring, by a rotatable cam 11 mounted between the vertical walls beside the outer edge of the swinging jaw. This cam may be rotated at any desired speed by any suitable power means as, for example, by an electric motor 12 operating through a suitable gear train 13.

When the motor is set in operation, the swinging jaw will alternately be forced towards the stationary jaw by the cam and retracted by the spring. Therefore, if a nut is placed between the jaws while they are open, it will be cracked when the jaws close, and will drop down through the wide mouth at the lower ends of the converging jaws when the latter are again opened. The table is preferably provided with a hole 14 extending through the same below the space between the jaws, so that the cracked nuts may drop down through this hole into a suitable receptacle.

The nuts to be cracked are preferably delivered to the jaws in suitable yieldable holders which will insure the proper positioning of the nuts between the jaws. In the arrangement shown, the holder is in the form of a pair of tongs, consisting of a resilient U-shaped bar 15 having at its free ends heads 16 and 17 recessed on their inner sides, as indicated at 18, to form seats for the ends of a nut, of which one is shown at A in Figs. 3 and 6. The members 16 and 17 are either so shaped or so held by the resilient part 15 that their outer faces lie in planes converging at the same angle as the angle between the jaws of the machine when the jaws are open. Furthermore, these outer faces are provided with ratchet teeth 19 similar to the teeth 9, but oppositely disposed. Therefore, when the head portion of the holder is placed between the jaws and the jaws are closed, the teeth on the holder interlock with those on the jaws and prevent the holder from slipping down along the jaws.

In operation, assuming that the motor is running, the attendant grips a nut in the tongs-like holder, inserts the head end into the holder through one of the windows in the vertical walls of the machine, and moves the holder up until the sides are in contact with the jaws; this being done while the jaws are open. Then, as the jaws close, the nut is cracked, the holder yielding so as not to offer any resistance to the cracking operation. As the jaws begin to open, the attendant permits the holder to open so as to drop the fragments of the nut; whereupon the holder is withdrawn to take up another nut. If the sockets or seats in the heads of the holder are made deep enough the nuts cannot possibly slip during the cracking operation, because they cannot leave the seats in the holder and the holder is interlocked with the jaws.

It will be seen that since the jaws converge upwardly they afford a wide mouth at the bottom through which the fragments of the nuts may drop, and consequently the fragments meet no obstruction after being released from the holder; and there is therefore no danger that the fragments will clog or choke the machine.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:—

1. A nut-cracking machine comprising a pair of jaws arranged in a vertical plane and converging toward the top, means for producing relative movements of the jaws from and toward each other, and a yieldable holder for a nut adapted to be positioned between said jaws and having inclined sides for engagement with the working faces of the jaws.

2. A nut-cracking machine comprising a pair of jaws arranged in a vertical plane and converging toward the top, means for producing relative movements of the jaws from and toward each other, and a yieldable holder for a nut adapted to be positioned between said jaws and having inclined sides for engagement with the working faces of the jaws, the cooperating faces of the jaws and the holder being serrated to prevent the holder from sliding down along the jaws when the latter are closed on the holder.

3. A nut-cracking machine comprising a pair of jaws arranged in a vertical plane and converging toward the top, means for producing relative movements of the jaws from and toward each other, and a yieldable holder for a nut adapted to be positioned between said jaws and having inclined sides for engagement with the working faces of the jaws, the working faces of the jaws having upwardly-facing ratchet teeth and there being cooperating teeth on the sides of the holder.

4. A nut-cracking machine comprising a table, two parallel vertical walls rising from the table and spaced a short distance apart, two upwardly converging jaws fitting between said walls, one of said jaws being stationary and the other being hung so as to swing from its upper end, a spring fixed at its ends to the swinging jaw and to a stationary part of the structure to pull the swinging jaw away from the movable jaw, a cam mounted between said walls in engagement with the swinging jaw for the purpose of moving the latter toward the stationary jaw, power means for rotating said cam, said walls having windows opposite the space between said jaws, said table having a hole extending through the same below said jaws to permit the passage of fragments of nuts cracked by said jaws, and a yieldable holder for a nut of a size and shape to permit it to be inserted through one of said windows.

In testimony whereof, I sign this specification.

BENJAMIN J. GUIDARELLI